(12) United States Patent
Shen et al.

(10) Patent No.: US 10,598,532 B2
(45) Date of Patent: Mar. 24, 2020

(54) METER ELECTRONICS FOR TWO OR MORE METER ASSEMBLIES

(71) Applicant: Micro Motion, Inc., Boulder, CO (US)

(72) Inventors: Kai Shen, Nanjing (CN); Richard L. Maginnis, Lafayette, CO (US); Fengchuan Gao, Nanjing (CN); Huan Liu, Nanjing (CN)

(73) Assignee: Micro Motion, Inc., Boulder, CO (US)

( * ) Notice: Subject to any disclaimer, the term of this patent is extended or adjusted under 35 U.S.C. 154(b) by 41 days.

(21) Appl. No.: 16/070,182

(22) PCT Filed: Feb. 26, 2016

(86) PCT No.: PCT/CN2016/074626
§ 371 (c)(1),
(2) Date: Jul. 13, 2018

(87) PCT Pub. No.: WO2017/143577
PCT Pub. Date: Aug. 31, 2017

(65) Prior Publication Data
US 2019/0025106 A1    Jan. 24, 2019

(51) Int. Cl.
*G01F 1/84* (2006.01)
(52) U.S. Cl.
CPC .......... *G01F 1/8436* (2013.01); *G01F 1/8459* (2013.01)
(58) Field of Classification Search
None
See application file for complete search history.

(56) References Cited

U.S. PATENT DOCUMENTS

| 5,168,877 | A | 12/1992 | Yamaguchi et al. |
| 5,455,781 | A * | 10/1995 | Reynal .................. G01F 25/003 700/282 |
| 5,661,232 | A | 8/1997 | Van Cleve et al. |
| 6,629,046 | B1 | 9/2003 | Bond et al. |
| 8,302,489 | B2 | 11/2012 | Bell et al. |
| 8,726,722 | B2 | 5/2014 | Henry |
| 2009/0007968 | A1 | 1/2009 | Knecht et al. |
| 2011/0264385 | A1 | 10/2011 | Weinstein et al. |
| 2012/0125124 | A1 | 5/2012 | Hays et al. |
| 2014/0123727 | A1* | 5/2014 | Weinstein ............. G01F 1/8436 73/1.16 |
| 2014/0188421 | A1* | 7/2014 | Fraser ................. G01F 25/0053 702/100 |

FOREIGN PATENT DOCUMENTS

| CN | 103201955 A | 7/2013 |
| CN | 102565132 B | 2/2015 |

(Continued)

*Primary Examiner* — Harshad R Patel
(74) *Attorney, Agent, or Firm* — The Ollila Law Group LLC

(57) ABSTRACT

A meter electronics (100) for two or more meter assemblies (10a, 10b). The meter electronics (100) includes a processor (110) and one or more signal processors (120) communicatively coupled to the processor (110). The one or more signal processors (120) are configured to communicatively couple to a first meter assembly (10a) and a second meter assembly (10b). Accordingly, only one meter electronics can be employed to control the two or more meter assemblies, which may reduce the costs associated with employing two meter electronics.

19 Claims, 4 Drawing Sheets

(56) References Cited

FOREIGN PATENT DOCUMENTS

| | | |
|---|---|---|
| JP | 2003177049 A | 6/2003 |
| WO | 200101083 A1 | 1/2001 |
| WO | 2006022742 A1 | 3/2006 |
| WO | 2006091199 A1 | 8/2006 |
| WO | 2008013545 A1 | 1/2008 |
| WO | 2008024112 A1 | 2/2008 |
| WO | 2008111983 A1 | 9/2008 |
| WO | 2009017494 A1 | 2/2009 |
| WO | 2009105096 A1 | 8/2009 |
| WO | 2009148451 A1 | 12/2009 |
| WO | 2010056244 A1 | 5/2010 |
| WO | 2012026941 A1 | 3/2012 |
| WO | 2013006171 A1 | 1/2013 |
| WO | 2014178828 A1 | 11/2014 |
| WO | 2016010514 A1 | 1/2016 |

\* cited by examiner

METER ELECTRONICS FOR TWO OR MORE METER ASSEMBLIES

TECHNICAL FIELD

The embodiments described below relate to meter electronics and, more particularly, to meter electronics for two or more meter assemblies.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

Many systems utilize two or more meter assemblies due to various design constraints. For example, meter assemblies used in dispensing liquid natural gas (LNG) to LNG vehicles may utilize a first meter assembly to measure fuel pumped from an LNG storage tank to the LNG vehicle. A second meter assembly may be used to measure the fuel that is returned to the LNG tank. The fuel returned to the LNG tank may have a different flow rate, temperature, state, etc. However, each meter assembly has a single meter electronics. Reducing the number of meter electronics can reduce the costs and complexity of the systems that require two or more meter assemblies. Accordingly, there is a need for a meter electronics for two or more meter assemblies.

SUMMARY

A meter electronics for two or more meter assemblies is provided. According to an embodiment, the meter electronics comprises a processor and one or more signal processors communicatively coupled to the processor. The one or more signal processors are configured to communicatively couple to a first meter assembly and a second meter assembly.

A method of operating two or more meter assemblies is provided. According to an embodiment, the method comprises providing a first sensor signal, the first sensor signal being provided by a first meter assembly, providing a second sensor signal, the second sensor signal being provided by a second meter assembly, and receiving the first sensor signal and the second sensor signal with a meter electronics.

A system with meter electronics for two or more meter assemblies is provided. According to an embodiment, the system comprises a first meter assembly, a second meter assembly and a meter electronics communicatively coupled to the first meter assembly and the second meter assembly.

ASPECTS

According to an aspect, a meter electronics (100) for two or more meter assemblies (10a, 10b) comprises a processor (110) and one or more signal processors (120) communicatively coupled to the processor (110), wherein the one or more signal processors (120) are configured to communicatively couple to a first meter assembly (10a) and a second meter assembly (10b).

Preferably, the one or more signal processors (120) are further configured to receive a first sensor signal (12a) from the first meter assembly (10a) and a second sensor signal (12b) from the second meter assembly (10b).

Preferably, the one or more signal processors (120) are further configured to digitize the first sensor signal (12a) and the second sensor signal (12b).

Preferably, the one or more signal processors (120) are further configured to provide a first drive signal (14a) to a first meter assembly (10a) and a second drive signal (14b) to a second meter assembly (10b).

Preferably, the meter electronics (100) further comprises a communication port (140) communicatively coupled to the processor (110), wherein the communication port (140) is configured to communicatively couple with a host.

Preferably, the one or more signal processors (120) are configured to receive the first sensor signal (12a) via a first communication channel (112a) and the second sensor signal (12b) via a second communication channel (112b).

Preferably, first sensor signal (12a) is comprised of signals from a left pick-off sensor (17al, 17bl) and a right pick-off sensor (17ar, 17br) in the first meter assembly (10a) and the second sensor signal (12b) is comprised of signals from a left pick-off sensor (17al, 17bl) and a right pick-off sensor (17ar, 17br) in the second meter assembly (10b).

Preferably, the meter electronics (100) further comprises at least one memory (130) communicatively coupled to the processor (110).

According to an aspect, a method of operating two or more meter assemblies comprises providing a first sensor signal, the first sensor signal being provided by a first meter assembly, providing a second sensor signal, the second sensor signal being provided by a second meter assembly, and receiving the first sensor signal and the second sensor signal with a meter electronics.

Preferably, the method further comprises providing a first drive signal to the first meter assembly, and providing a second drive signal to the second meter assembly, wherein the first drive signal and the second drive signal are provided by the meter electronics.

Preferably, the method further comprises digitizing the first sensor signal and the second sensor signal with at least one signal processor.

Preferably, the first and second sensor signal is provided to the meter electronics through a first communication channel and the second sensor signal is provided through a second communication channel.

Preferably, the first sensor signal is comprised of signals from a left pick-off sensor and a right pick-off sensor in the first meter assembly and the second sensor signal is comprised of signals from a left pick-off sensor and a right pick-off sensor in the second meter assembly.

According to an aspect, a system (5) with meter electronics (100) for two or more meter assemblies comprises a first meter assembly (10a), a second meter assembly (10b); and a meter electronics (100) communicatively coupled to the first meter assembly (10a) and the second meter assembly (10b).

Preferably, the first meter assembly (10a) is configured to measure one of a property and a characteristic of a fluid in a supply line (SL) and the second meter assembly (10b) is configured to measure one of a property and a characteristic of a fluid in a return line (RL).

BRIEF DESCRIPTION OF THE DRAWINGS

The same reference number represents the same element on all drawings. It should be understood that the drawings are not necessarily to scale.

DETAILED DESCRIPTION

FIGS. 1-4 and the following description depict specific examples to teach those skilled in the art how to make and use the best mode of embodiments of a meter electronics for two or more meter assemblies. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the meter electronics for two or more meter assemblies. As a result, the embodiments described below are not limited to the specific examples described below, but only by the claims and their equivalents.

The meter electronics for two or more vibratory sensors is configured to communicate with two or more meter assemblies. The meter electronics may include a processor that is communicatively coupled to one or more signal processors. The one or more signal processors are configured to communicatively couple to a first meter assembly and a second meter assembly. The meter electronics may be communicatively coupled to the first meter assembly via a first communication channel and the second meter assembly via a second communication channel. The first and second communication channels may be configured to communication sensor, drive, temperature, and/or other signals. Accordingly, only one meter electronics can be employed to control the two or more meter assemblies, which may reduce the costs associated with employing two meter electronics.

Vibratory Sensor System

Figure 1:
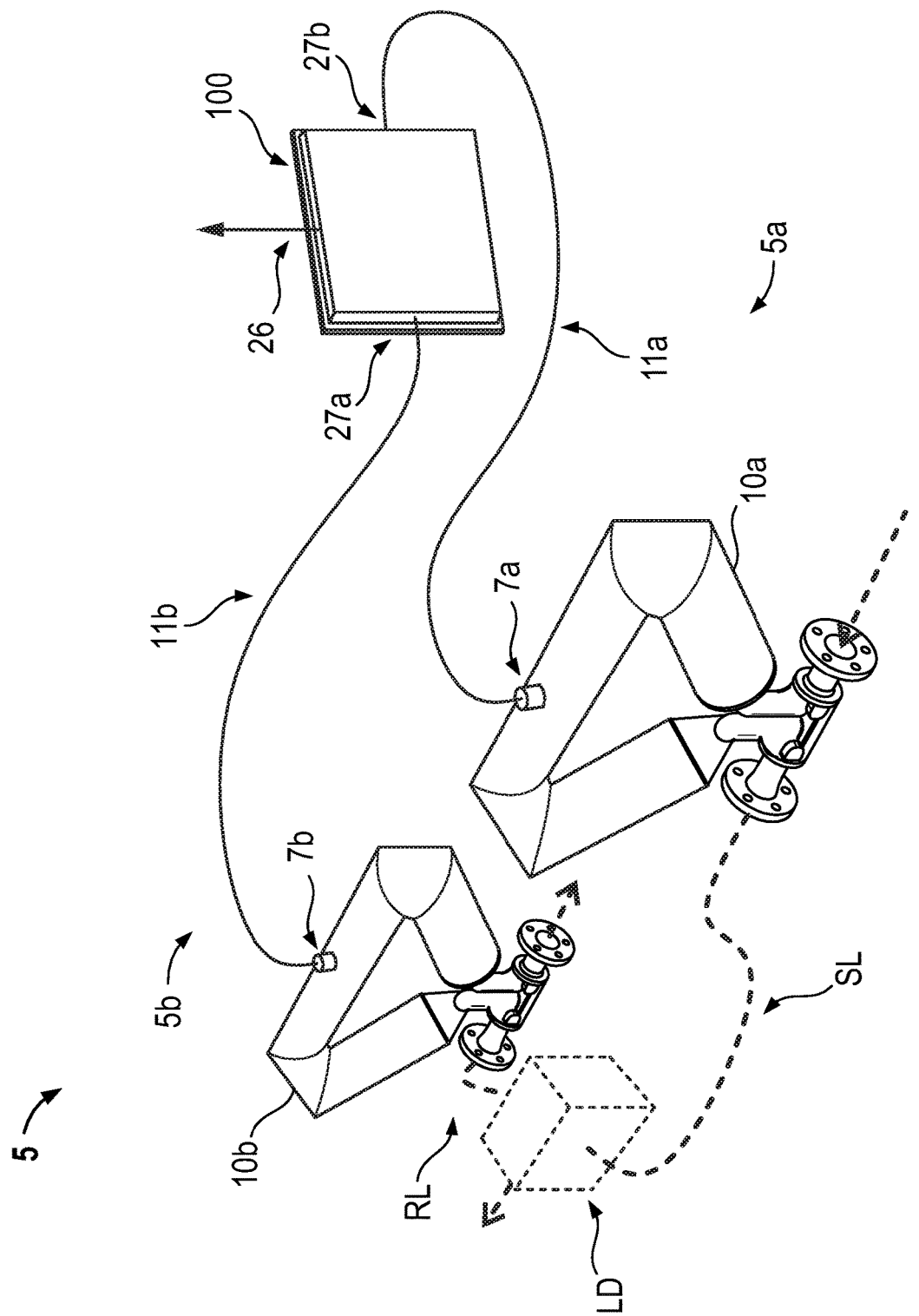
FIG. 1 shows a dual vibratory sensor system 5 that includes a meter electronics 100 for two or more meter assemblies.

FIG. 1 shows a dual vibratory sensor system 5 that includes a meter electronics 100 for two or more meter assemblies. As shown in FIG. 1, the dual vibratory sensor system 5 includes a first vibratory sensor 5a and a second vibratory sensor 5b. The first and second vibratory sensor 5a, 5b are respectively comprised of the meter electronics 100 and the first and second meter assembly 10a, 10b.

The meter electronics 100 is communicatively coupled to the first and second meter assembly 10a, 10b via a first and second set of leads 11a, 11b. The first and second set of leads 11a, 11b are coupled (e.g., attached, affixed, etc.) to a first and second communication port 27a, 27b on the meter electronics 100. The first and second set of leads 11a, 11b are also coupled to the first and second meter assembly 10a, 10b via a first and second communication port 7a, 7b on the first and second meter assembly 10a, 10b. The meter electronics 100 is configured to provide information over path 26 to a host. The first and second meter assembly 10a, 10b are shown with a case that surrounds flow tubes. The meter electronics 100 and first and second meter assembly 10a, 10b are described in more detail in the following with reference to FIGS. 2 and 3.

Still referring to FIG. 1, the first and second vibratory sensor 5a, 5b can be used to, for example, calculate a difference in flow rate and/or total flow between a supply line SL and a return line RL. More specifically, the dual vibratory sensor system 5 may be employed in a cryogenic application where fluid is supplied from a tank in liquid state and then returned to the tank in a gaseous state. In one exemplary cryogenic application, the first meter assembly 10a may be part of the supply line SL that supplies LNG to an LNG dispenser LD and the second meter assembly 10b may be part of a return line RL from the LNG dispenser LD. The total flow through the second meter assembly 10b can be subtracted from the total flow through the first meter assembly 10a to determine the total amount of LNG supplied to the LNG vehicle. This exemplary application with the supply and return line SL, RL is shown with dashed lines to illustrate that the dual vibratory sensor system 5 can be employed in other applications. Other cryogenic fluids may be employed, such as hydrogen, or the like. As can also be appreciated, in the described and other embodiments, the calculations can be performed by the meter electronics 100, which is described in more detail in the following.

Figure 2:
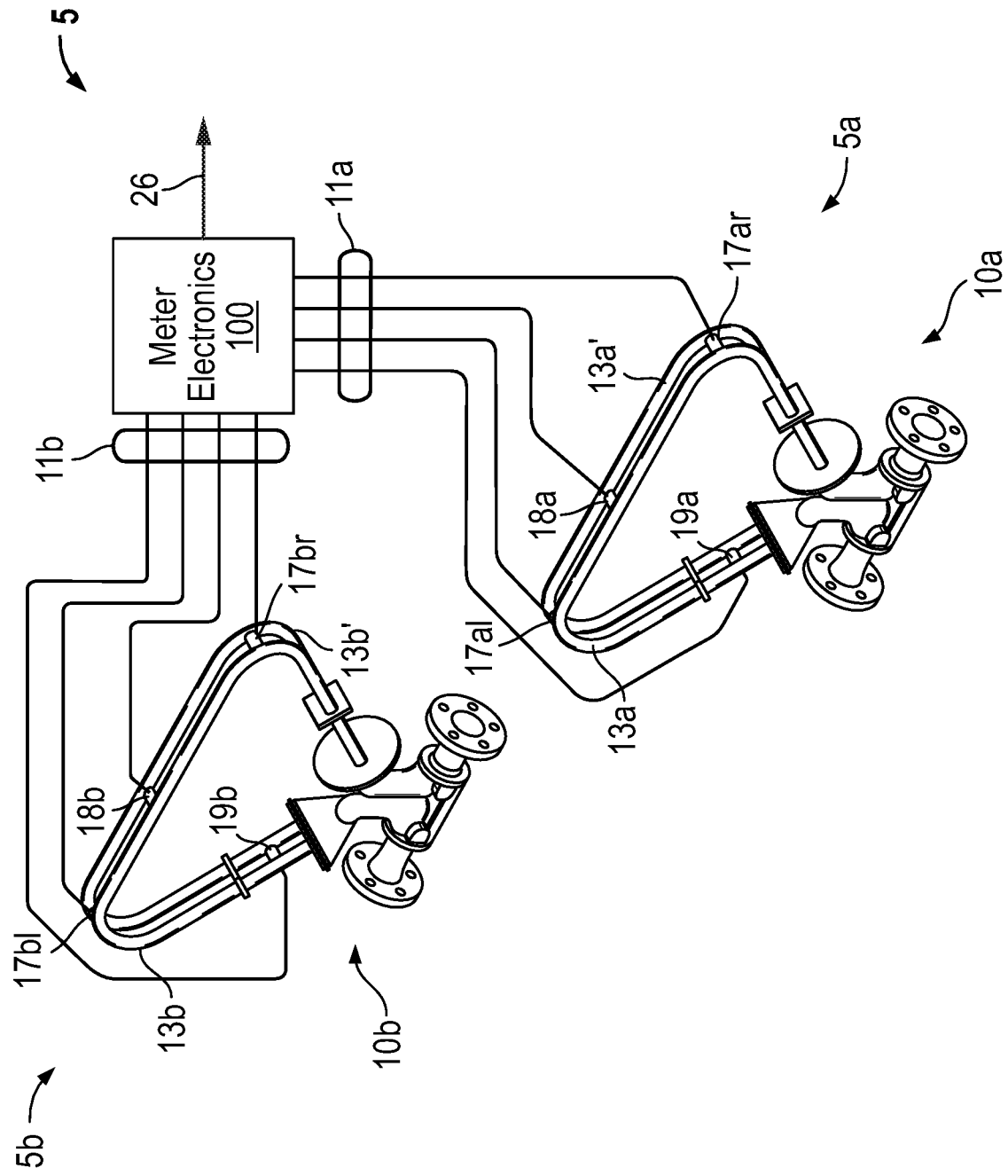
FIG. 2 shows the dual vibratory sensor system 5 that includes the meter electronics 100 for two or more meter assemblies.

FIG. 2 shows the dual vibratory sensor system 5 that includes the meter electronics 100 for two or more meter assemblies. As shown in FIG. 2, the dual vibratory sensor system 5 includes the first vibratory sensor 5a and the second vibratory sensor 5b described in the foregoing with reference to FIG. 1. The cases on the meter electronics 100 and first and second meter assembly 10a, 10b are not shown for clarity. The first and second meter assembly 10a, 10b respond to mass flow rate and density of a process material. The meter electronics 100 is connected to the first and second meter assembly 10a, 10b via a first and second set of leads 11a, 11b to provide density, mass flow rate, and temperature information over the path 26, as well as other information. A Coriolis flow meter structure is described although it is apparent to those skilled in the art that the present invention could be practiced as a vibrating conduit densitometer, tuning fork densitometer, or the like.

The first and second meter assembly 10a, 10b include a pair of parallel conduits 13a, 13a' and 13b, 13b', a first and second drive mechanism 18a, 18b, temperature sensor 19a, 19b, and pair of left and right pick-off sensors 17al, 17ar and 17bl, 17br. Each of the pair of conduits 13a, 13a' and 13b, 13b' bend at two symmetrical locations along the conduits 13a, 13a' and 13b, 13b' length and are essentially parallel throughout their length. The conduits 13a, 13a' and 13b, 13b' are driven by the drive mechanisms 18a, 18b in opposite directions about their respective bending axes and at what is termed the first out-of-phase bending mode of the flow meter. The drive mechanisms 18a, 18b may comprise any one of many arrangements, such as a magnet mounted to the conduits 13a', 13b' and an opposing coil mounted to the conduits 13a, 13b and through which an alternating current is passed for vibrating both conduits 13a, 13a' and 13b, 13b'. A suitable drive signal is applied by the meter electronics 100 to the drive mechanisms 18a, 18b.

The first and second vibratory sensor 5a, 5b can be initially calibrated and a flow calibration factor FCF, along with a zero offset $\Delta T_0$, can be generated. In use, the flow calibration factor FCF can be multiplied by the time delay $\Delta T$ measured by the pickoffs minus the zero offset $\Delta T_0$ to generate a mass flow rate ṁ. An example of a mass flow rate equation utilizing a flow calibration factor FCF and a zero offset $\Delta T_0$ is described by Equation (1):

$$\dot{m} = FCF(\Delta T_{measured} - \Delta T_0) \quad (1)$$

Where:
ṁ=mass flow rate
FCF=flow calibration factor
$\Delta T_{measured}$=measured time delay
$\Delta T_0$=initial zero offset The temperature sensors 19a, 19b are mounted to conduits 13a', 13b' to continuously measure the temperature of the conduits 13a', 13b'. The temperature of the conduits 13a', 13b' and hence the voltage appearing across the temperature sensors 19a, 19b for a given current is governed by the temperature of the material passing through the conduits 13a', 13b'. The temperature dependent voltages appearing across the temperature sensors 19a, 19b may be used by the meter electronics 100 to compensate for the change in elastic modulus of the conduits 13a', 13b' due to any changes in conduit temperature. In the embodiment shown, the temperature sensors 19a, 19b are resistive temperature detectors (RTD). Although the embodiments described herein employ RTD sensors, other temperature sensors may be employed in alternative embodiments, such as thermistors, thermocouples, etc.

The meter electronics 100 receives the left and right sensor signals from the left and right pick-off sensors 17al, 17ar and 17bl, 17br and the temperature signals from the temperature sensors 19a, 19b via the first and second set of leads 11a, 11b. The meter electronics 100 provides a drive signal to the drive mechanism 18a, 18b and vibrates the first and second pair of conduits 13a, 13a' and 13b, 13b'. The meter electronics 100 processes the left and right sensor signals and the temperature signals to compute the mass flow rate and the density of the material passing through the first and/or second meter assembly 10a, 10b. This information, along with other information, is applied by meter electronics 100 over path 26 as a signal.

As can be appreciated, although the dual vibratory sensor system 5 shown in FIGS. 1 and 2 includes only two meter assemblies 10a, 10b, the dual vibratory sensor system 5 may be employed in systems that include more than two meter assemblies. For example, a meter electronics may be configured to communicate with three or more meter assemblies. In such a configuration, the dual vibratory sensor system 5 may be a portion of the meter electronics and two of the three or more meter assemblies.

Meter Electronics

Figure 3:
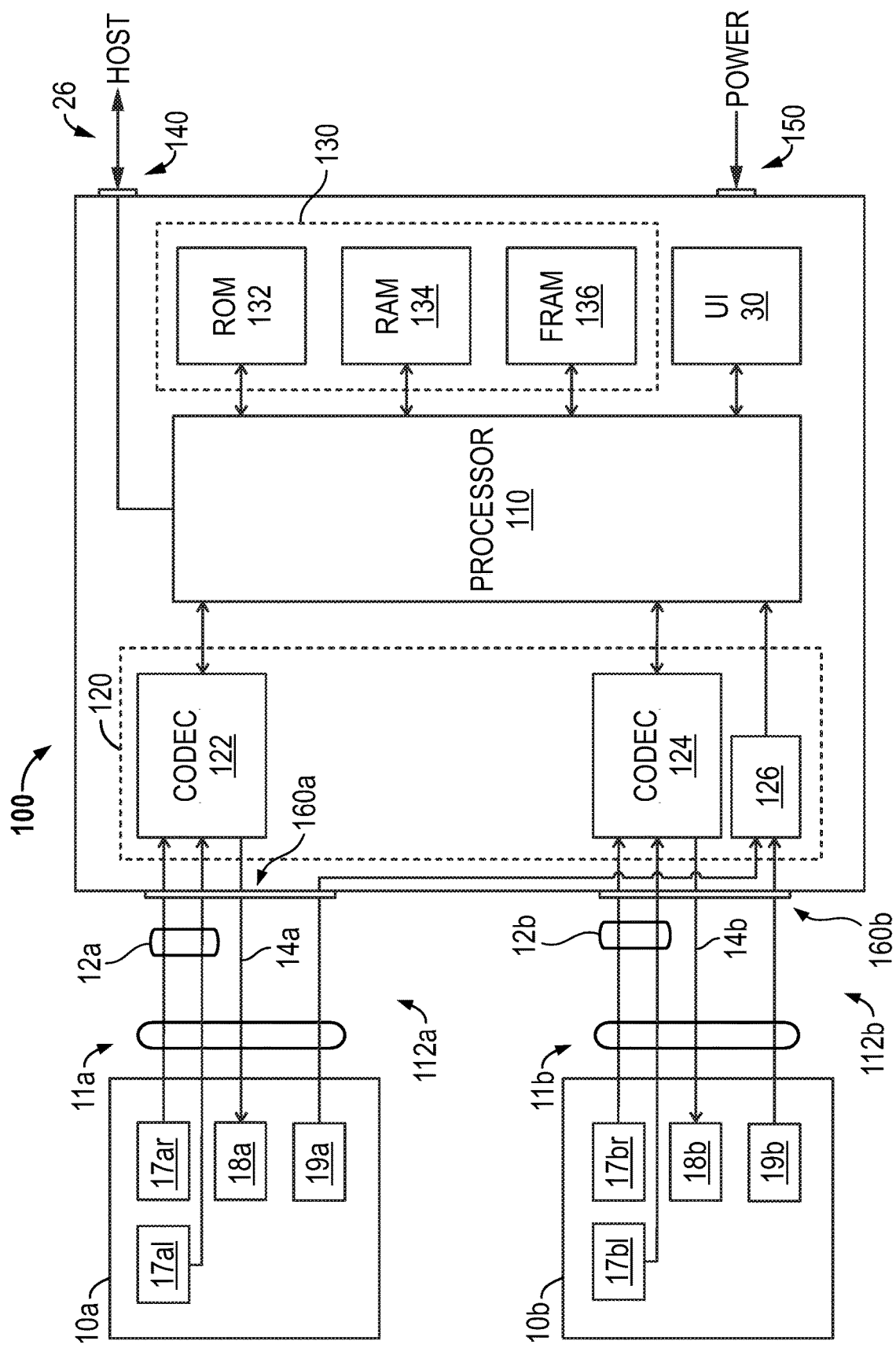
FIG. 3 shows a block diagram of the meter electronics 100.

FIG. 3 shows a block diagram of the meter electronics 100. As shown in FIG. 3, the meter electronics 100 is communicatively coupled to the first and second meter assembly 10a, 10b. As described in the foregoing with reference to FIG. 1, the first and second meter assembly 10a, 10b include the left and right pick-off sensors 17al, 17ar and 17bl, 17br, drive mechanisms 18a, 18b, and temperature sensors 19a, 19b, which are communicatively coupled to the meter electronics 100 via the first and second set of leads 11a, 11b through a first and second communication channel 112a, 112b and a first and second I/O port 160a, 160b.

The meter electronics 100 provides a first and second drive signal 14a, 14b via the leads 11a, 11b. More specifically, the meter electronics 100 provides a first drive signal 14a to the drive mechanism 18a in the first meter assembly 10a. The meter electronics 100 is also configured to provide a second drive signal 14b to the drive mechanism 18b in the second meter assembly 10b. In addition, a first and second sensor signal 12a, 12b are respectively provided by the first and second meter assembly 10a, 10b. More specifically, in the embodiment shown, the first sensor signal 12a is provided by the left and right pick-off sensor 17al, 17ar in the first meter assembly 10a. The second sensor signal 12b is provided by the left and right pick-off sensor 17bl, 17br in the second meter assembly 10b. As can be appreciated, the first and second sensor signal 12a, 12b are respectively provided to the meter electronics 100 through the first and second communication channel 112a, 112b.

The meter electronics 100 includes a processor 110 communicatively coupled to one or more signal processors 120 and one or more memories 130. The processor 110 is also communicatively coupled to a user interface 30. The processor 110 is communicatively coupled with the host via a communication port 140 over the path 26 and receives electrical power via an electrical power port 150. The processor 110 may be a microprocessor although any suitable processor may be employed. For example, the processor 110 may be comprised of sub-processors, such as a multi-core processor, serial communication ports, peripheral interfaces (e.g., serial peripheral interface), on-chip memory, I/O ports, and/or the like. In these and other embodiments, the processor 110 is configured to perform operations on received and processed signals, such as digitized signals.

The processor 110 may receive digitized sensor signals from the one or more signal processors 120. The processor 110 is also configured to provide information, such as a phase difference, a property of a fluid in the first or second meter assembly 10a, 10b, or the like. The processor 110 may provide the information to the host through the communication port 140. The processor 110 may also be configured to communicate with the one or more memories 130 to receive and/or store information in the one or more memories 130. For example, the processor 110 may receive calibration factors and/or meter assembly zeros (e.g., phase difference when there is zero flow) from the one or more memories 130. Each of the calibration factors and/or meter assembly zeros may respectively be associated with the first and second vibratory sensor 5a, 5b and/or the first and second meter assembly 10a, 10b. The processor 110 may use the calibration factors to process digitized sensor signals received from the one or more signal processors 120.

The one or more signal processors 120 is shown as being comprised of a first and second encoder/decoder (CODEC) 122, 124 and an analog-to-digital converter (ADC) 126. The one or more signal processors 120 may condition analog signals, digitize the conditioned analog signals, and/or provide the digitized signals. The first and second CODEC 122, 124 are configured to receive the left and right sensor signal from the left and right pick-off sensors 17al, 17ar and 17bl, 17br. The first and second CODEC 122, 124 are also configured to provide the first and second drive signal 14a, 14b to the first and second drive mechanism 18a, 18b. In alternative embodiments more or fewer signal processors may be employed. For example, a single CODEC may be employed for the first and second sensor signal 12a, 12b and first and second drive signal 14a, 14b. Additionally or alternatively, two ADCs may be employed instead of the single ADC 126.

In the embodiment shown, the one or more memories 130 is comprised of a read-only memory (ROM) 132, random access memory (RAM) 134, and a ferroelectric random-access memory (FRAM) 136. However, in alternative embodiments, the one or more memories 130 may be comprised of more or fewer memories. Additionally or alternatively, the one or more memories 130 may be comprised of different types of memory (e.g., volatile, non-volatile, etc.). For example, a different type of non-volatile memory, such as, for example, erasable programmable read only memory (EPROM), or the like, may be employed instead of the FRAM 136.

As can also be appreciated, although the dual vibratory sensor system 5 shown in FIG. 3 includes only two meter assemblies 10a, 10b, the dual vibratory sensor system 5 may be employed in systems that include more than two meter assemblies. For example, a meter electronics may be configured to communicate with three or more meter assemblies. In such a configuration, the dual vibratory sensor system 5 may be a portion of the meter electronics and two of the three or more meter assemblies.

Accordingly, the meter electronics 100 may be configured to convert the first and second sensor signal 12a, 12b from analog signals to digital signals. The meter electronics 100 may also be configured to process the digitized sensor signals to determine properties of the fluid in the first and second meter assembly 10a, 10b. For example, in an embodiment, the meter electronics 100 can respectively determine a first and second phase difference between the left and right pick-off sensors 17al, 17ar and 17bl, 17br in the first and second meter assembly 10a, 10b. An exemplary method is described in more detail in the following with reference to FIG. 4.

Method

Figure 4:
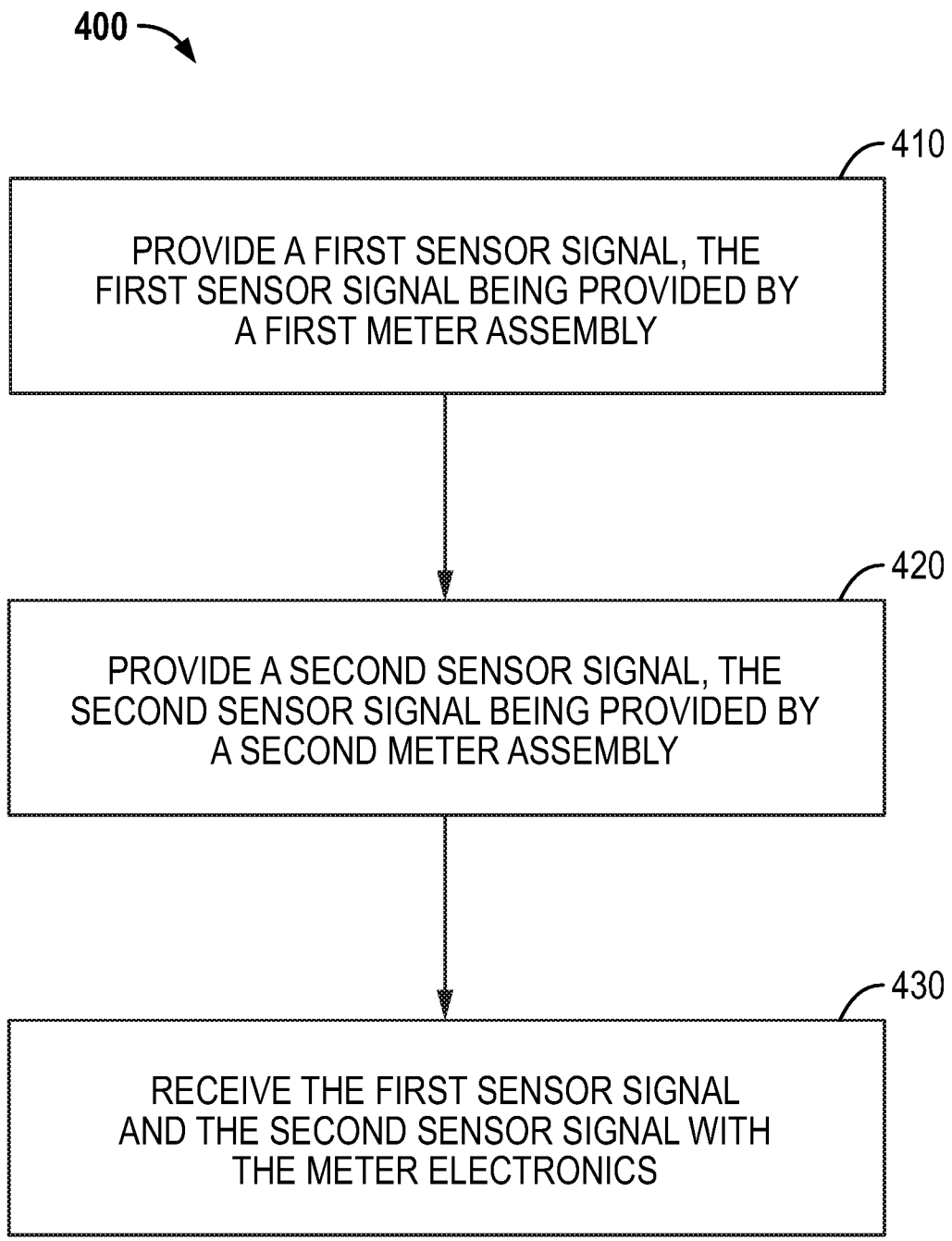
FIG. 4 shows a method 400 for operating a meter electronics for two or more vibratory sensors.

FIG. 4 shows a method 400 for operating a meter electronics for two or more vibratory sensors. In step 410, the method 400 provides a first sensor signal, the first sensor being provided by a first meter assembly. In step 420, a second sensor signal is provided, the second sensor signal being provided by the second meter assembly. The first and second meter assembly may be the first and second meter assembly 10a, 10b described in the foregoing with reference to FIGS. 1-3. In step 430, the first and second sensor signal are received with a meter electronics, which may be the meter electronics 100 described in the foregoing with reference to FIGS. 2 and 3.

In an embodiment, the first and second sensor signal 12a, 12b may be provided to the one or more signal processors 120 in the meter electronics 100. For example, the first and second meter assembly 10a, 10b may provide the first and second sensor signal 12a, 12b to the first and second CODEC 122, 124. The first and second sensor signal 12a, 12b may be in analog form (e.g., continuously varying voltage and/or current), although any suitable signal may be provided.

Additional steps may be performed. For example, the meter electronics 100 can provide the first and second drive signal 14a, 14b to the first and second meter assembly 10a, 10b. More specifically, the processor 110 may provide a signal to the one or more signal processors 120. The signal provided by the processor 110 may control one or more parameters (e.g., amplitude, frequency, phase angle, etc.) of the drive signals provided to the first and second meter assembly 10a, 10b. The one or more signal processors 120 can receive the signal provided by the processor 110 and provide the first and second drive signal 14a, 14b based on the signal provided by the processor 110.

For example, the processor 110 may provide a desired first and second amplitude and phase angle to the first and second CODEC 122, 124. The first and second CODEC 122, 124 can receive and digitize the first and second sensor signal 12a, 12b. The digitized first and second sensor signal 12a, 12b can be respectively adjusted to be the same as the first and second desired amplitude and phase angle provided by the processor 110. The first amplitude and/or phase angle may be different than the second amplitude and/or phase angle. For example, the first drive signal 14a may have an amplitude that is smaller than an amplitude of the second drive signal 14b.

The first and second sensor signal 12a, 12b may also be processed to determine properties of the fluid in the first and second vibratory sensor 5a, 5b. For example, the meter electronics 100 can receive the first sensor signal 12a and determine a property and/or characteristic of the fluid in the first meter assembly 10a. In an embodiment, the first sensor signal 12a may be comprised of the signals provided by the left and right pick-off sensors 17al, 17ar and 17bl, 17br in the first meter assembly 10a. Accordingly, the meter electronics 100 can compare the signals received from the left and right pick-off sensors 17al, 17ar and 17bl, 17br to determine a phase difference between the conduits 13a, 13a' in the first meter assembly 10a. The phase difference may be used to determine the property (e.g., density, temperature, state, etc.) and/or characteristic (e.g., flow rate, phase ratios, bubble sizes, etc.) of the fluid in the first meter assembly 10a. The property and/or characteristic of the fluid in the second meter assembly 10b may similarly be determined.

In an exemplary embodiment, the characteristic of the fluid may be a flow rate of the fluid through the first meter assembly 10a. The flow rate can be determined from the phase difference or time delay, provided as described in the foregoing, by multiplying the phase difference or time delay with a calibration factor (e.g., flow calibration factor (FCF)). A meter zero may be subtracted from the phase difference or time delay before being multiplied with the calibration factor. The calibration factor is associated with each of the first and second vibratory sensor 5a, 5b and/or first and second meter assembly 10a, 10b. Accordingly, the flow rate may be calculated for the fluid in each of the first and second meter assembly 10a, 10b.

The total mass flow over a period of time can also be calculated. For example, the total mass flow over a period of time for each of the first and second meter assembly 10a, 10b may be calculated by integrating the mass flow rate over the period of time. The total mass flow for the first meter assembly 10a may be different than the total mass flow for the second meter assembly 10b. For example, the first meter assembly 10a may be part of a supply line that provides liquid natural gas to the LNG dispenser. The second meter assembly 10b may be part of a return line that removes gaseous natural gas from the LNG dispenser. Accordingly, since LNG is dispensed, the total mass flow through the first meter assembly 10a is different than the total mass flow through the second meter assembly 10b.

In operation, the meter electronics 100 receives the first and second sensor signal 12a, 12b. The first and second sensor signal 12a, 12b may include signals provided by the left and right pick-off sensors 17al, 17ar and 17bl, 17br in the first and second meter assembly 10a, 10b. A phase difference for each of the first and second sensor signal 12a, 12b can be calculated using the signals from the left and right pick-off sensors 17al, 17ar and 17bl, 17br. Using the phase difference, the meter electronics 100 can, for example, calculate a mass flow rate through each of the first and second meter assembly 10a, 10b.

The meter electronics 100 can calculate the total mass flow through each of the first and second meter assembly 10a, 10b, as described in the foregoing. The meter electronics can also compare the total mass flow through the first and second meter assembly 10a, 10b to determine, for example, the total mass of dispensed fluid. For example, in the foregoing example where the first meter assembly 10a is part of the supply line to a LNG dispenser and the second meter assembly 10b is part of the return line, the total amount of LNG dispensed may be calculated by subtracting the total mass flow through the second meter assembly 10b from the total mass flow through the first meter assembly 10a. Therefore, the total mass that is dispensed by the LNG dispenser may be determined.

The embodiments described above provide a meter electronics for two or more meter assemblies. For example, the meter electronics 100 may be communicatively coupled to the first and second meter assembly 10a, 10b. The meter electronics 100 can control and determine the properties and/or characteristics of the fluid flowing through the first and second meter assembly 10a, 10b. Because a single meter electronics is employed to both control and determine the properties and/or characteristics of the fluid through two more meter assemblies, the costs associated with employing a meter electronics for each of the two or more meter assemblies may be avoided.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other meter electronics for two or more meter assemblies and not just to the embodiments described above and shown in the accompanying figures. Accordingly, the scope of the embodiments described above should be determined from the following claims.

We claim:

1. A meter electronics (100) for two or more meter assemblies (10a, 10b), the meter electronics (100) comprising:
    a processor (110); and
    one or more signal processors (120) communicatively coupled to the processor (110), wherein the one or more signal processors (120) are configured to communicatively couple to a first meter assembly (10a) and a second meter assembly (10b) via leads (11a, 11b) connecting the meter electronics (100) to the two or more meter assemblies (10a, 10b),
    wherein the meter electronics (100) is configured to:
        store a first flow calibration factor associated with the first meter assembly (10a); and
        store a second flow calibration factor associated with the second meter assembly (10b).

2. The meter electronics (100) of claim 1, wherein the one or more signal processors (120) are further configured to receive a first sensor signal (12a) from the first meter assembly (10a) and a second sensor signal (12b) from the second meter assembly (10b).

3. The meter electronics (100) of claim 2, wherein the one or more signal processors (120) are further configured to digitize the first sensor signal (12a) and the second sensor signal (12b).

4. The meter electronics (100) of claim 1, wherein the one or more signal processors (120) are further configured to provide a first drive signal (14a) to a first meter assembly (10a) and a second drive signal (14b) to a second meter assembly (10b).

5. The meter electronics (100) of claim 1, further comprising a communication port (140) communicatively coupled to the processor (110), wherein the communication port (140) is configured to communicatively couple with a host.

6. The meter electronics (100) of claim 1, wherein the one or more signal processors (120) are configured to receive the first sensor signal (12a) via a first communication channel (112a) and the second sensor signal (12b) via a second communication channel (112b).

7. The meter electronics (100) of claim 1, wherein the first sensor signal (12a) is comprised of signals from a left pick-off sensor (17a1) and a right pick-off sensor (17ar) in the first meter assembly (10a) and the second sensor signal (12b) is comprised of signals from a left pick-off sensor (17b1) and a right pick-off sensor (17br) in the second meter assembly (10b).

8. The meter electronics (100) of claim 1, further comprising at least one memory (130) communicatively coupled to the processor (110).

9. The meter electronics (100) of claim 1, wherein the meter electronics (100) is further configured to:
    store a first zero-offset associated with the first meter assembly (10a); and
    store a second zero-offset associated with the second meter assembly (10b).

10. The meter electronics (100) of claim 9, wherein the meter electronics (100) is further configured to determine a difference between a total mass flow through the first meter assembly (10a) and a total mass flow through the second meter assembly (10b), the difference determined using the first calibration factor, the second calibration factor, the first zero-offset, and the second zero-offset.

11. A method of operating two or more meter assemblies, the method comprising:
providing a first sensor signal, the first sensor signal being provided by a first meter assembly;
providing a second sensor signal, the second sensor signal being provided by a second meter assembly;
receiving the first sensor signal and the second sensor signal with a meter electronics via leads connecting the meter electronics to the first meter assembly and the second meter assembly; and
storing a first flow calibration factor associated with the first meter assembly and a second flow calibration factor associated with the second meter assembly in the meter electronics.

12. The method of claim 11, further comprising:
providing a first drive signal to the first meter assembly; and
providing a second drive signal to the second meter assembly;
wherein the first drive signal and the second drive signal are provided by the meter electronics.

13. The method of claim 11, further comprising digitizing the first sensor signal and the second sensor signal with at least one signal processor.

14. The method of claim 11, wherein the first and second sensor signal is provided to the meter electronics through a first communication channel and the second sensor signal is provided through a second communication channel.

15. The method of claim 11, wherein the first sensor signal is comprised of signals from a left pick-off sensor and a right pick-off sensor in the first meter assembly and the second sensor signal is comprised of signals from a left pick-off sensor and a right pick-off sensor in the second meter assembly.

16. The method of claim 11,
determining, by the meter electronics, a difference between a total mass flow through the first meter assembly and a total mass flow through the second meter assembly, the difference determined using the first sensor signal, the second sensor signal, the first flow calibration factor associated with the first meter assembly, the second flow calibration factor associated with the second meter assembly, a first zero offset associated with the first meter assembly and a second zero-offset associated with the second meter assembly, wherein the first zero offset and the second zero-offset are stored in the meter electronics.

17. A system (5) with meter electronics (100) for two or more meter assemblies, the system (5) comprising:
a first meter assembly (10a);
a second meter assembly (10b); and
a meter electronics (100) communicatively coupled to the first meter assembly (10a) and the second meter assembly (10b) via leads connecting the meter electronics (100) to the first meter assembly (10a) and the second meter assembly (10b), wherein the meter electronics is configured to:
store a first flow calibration factor associated with the first meter assembly (10a); and
store a second flow calibration factor associated with the second meter assembly (10b).

18. The system (5) of claim 17, wherein the first meter assembly (10a) is configured to measure one of a property and a characteristic of a fluid in a supply line (SL) and the second meter assembly (10b) is configured to measure one of a property and a characteristic of a fluid in a return line (RL).

19. The system (5) of claim 17, the meter electronics further configured to:
store a first zero-offset associated with the first meter assembly (10a);
store a second zero-offset associated with the second meter assembly (10b); and
determine a difference between a total mass flow through the first meter assembly (10a) and a total mass flow through the second meter assembly (10b), the difference determined using the stored first flow calibration factor, stored second flow calibration factor, stored first zero-offset, and stored second zero-offset.

* * * * *